H. E. KIRSTEIN AND T. LEYTHAM.
OPHTHALMIC MOUNTING.
APPLICATION FILED AUG. 20, 1920.

1,424,828.

Patented Aug. 8, 1922.

INVENTORS
Thomas Leytham and
Henry E. Kirstein
BY
Davis & Simms
Their ATTORNEYS.

UNITED STATES PATENT OFFICE.

HENRY E. KIRSTEIN AND THOMAS LEYTHAM, OF ROCHESTER, NEW YORK, ASSIGNORS TO E. KIRSTEIN SONS COMPANY, OF ROCHESTER, NEW YORK, A CORPORATION OF NEW YORK.

OPHTHALMIC MOUNTING.

1,424,828.  Specification of Letters Patent.  Patented Aug. 8, 1922.

Application filed August 20, 1920. Serial No. 404,838.

*To all whom it may concern:*

Be it known that we, HENRY E. KIRSTEIN and THOMAS LEYTHAM, citizens of the United States, and residents of Rochester, in the county of Monroe and State of New York, have invented certain new and useful Improvements in Ophthalmic Mountings, of which the following is a specification.

The present invention relates to ophthalmic mountings and more particularly to the type in which temples are pivotally connected to the lens frames, an object of this invention being to provide a novel means of connecting a non-metallic temple with a non-metallic lens frame so that a mounting is provided which is neat in appearance and durable in use.

To this and other ends, the invention consists of certain parts and combinations of parts all of which will be hereinafter described, the novel features being pointed out in the appended claims.

Figure 1:
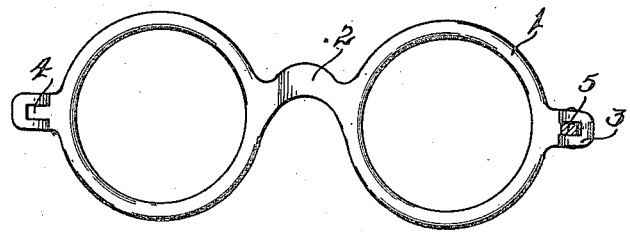
Fig. 1 is a rear face view of a mounting constructed in accordance with this invention.
Figure 2:
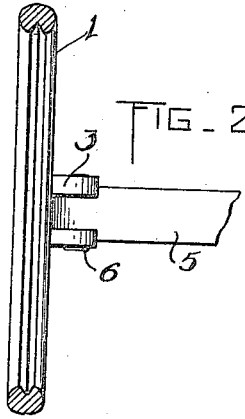
Fig. 2 shows a sectional view through one of the lens frames of the mounting.
Figure 3:
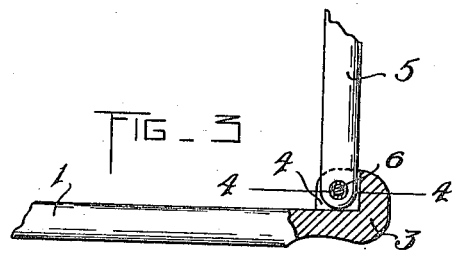
Fig. 3 is a detail sectional view showing the manner in which the temple connects with the temple supporting member on the lens frame.
Figure 5:
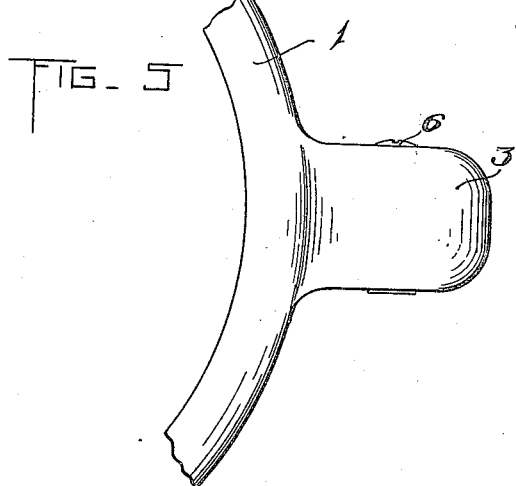
Fig. 5 is an enlarged detail view of the front face of the temple supporting member.
Figure 4:
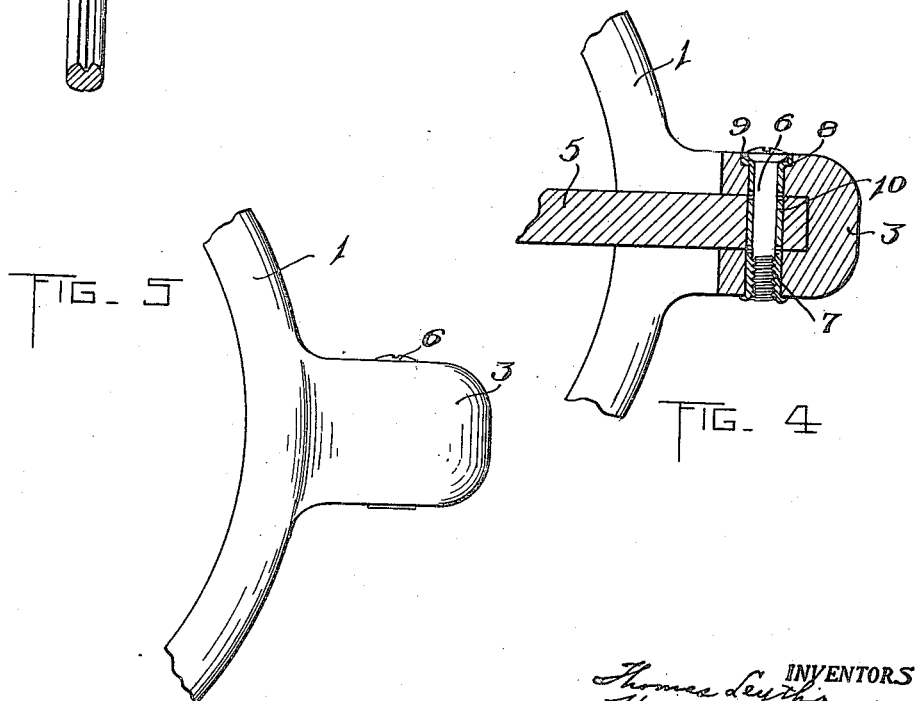
Fig. 4 is an enlarged vertical section through the mounting on the line 4—4, Fig. 3, the temple being folded inwardly.

Referring more particularly to the drawings, 1 indicates the lens frames connected by a bridge 2, such parts being preferably formed of non-metallic material such as zylonite. Each of the lens frames has at its outer side a temple supporting member 3 which is also formed of non-metallic material and preferably projects outwardly from its lens frame and also in rear of the plane of said lens frame. Its rearwardly projecting portion is provided with a pocket 4 which opens rearwardly and inwardly to form two ears, said pocket being closed at its front and outer sides. A temple 5 is pivotally mounted in the pocket on a pivot screw 6.

In order to strengthen the upper and lower walls of the pocket, the upper and lower walls may be provided with sleeves 7 and 8, the sleeve 8 having a countersunk portion 9 at its upper end for receiving the head of the screw fastener and the sleeve 7 having internal threads for receiving the screw threaded end of the fastener. The sleeves 7 and 8 are spaced at their inner ends from the opposed walls of the pocket so that they will not contact with the temple and will permit the upper and lower walls of the pocket to be drawn in firm contact with the temple, thus giving an entire non-metallic bearing between the parts. A sleeve 10 may be introduced into the temple to act as a bearing on the fastener 6, and the ends of this sleeve may also be spaced from the upper and lower faces of the temple 5 so that the metal of the sleeve 10 will not interfere with the non-metallic bearing surfaces between the temple and the walls of the pocket.

By this construction the pivotal connection between a temple and its lens frame is not visible from the front or the outer side of the mounting. The outward movement of the temple is limited by the outer wall of the pocket while an inward movement is obtained which will permit the temples to fold in parallel relation with the lens frames. A metallic bearing is provided for the temple and the anchorage of the screw in the temple is secured by metal sleeves, yet it is possible to draw the upper and lower walls of the pocket in firm contact with the temple so that the falling of the temple inwardly by its own weight cannot take place if the screw is properly adjusted.

What we claim as our invention and desire to secure by Letters Patent is:

1. An ophthalmic mounting comprising a non-metallic lens frame, a temple supporting member formed of non-metallic material and having a portion projecting outwardly and portions extending rearwardly from the plane of the frame and forming a pocket closed at its front and outer side and open at its rear and inner side, and a temple pivotally mounted in the pocket to fold inwardly over the rear face of the frame and to have its outward movement limited by the outer side of the pocket.

2. An ophthalmic mounting comprising a non-metallic lens frame, a temple supporting member formed of non-metallic material, projecting outwardly and rearwardly from the frame and having a pocket closed at its front and its outer side, and open at its rear and its inner side, a pivot pin connecting the upper and lower walls of the pocket, metallic means secured in the non-metallic temple supporting member and serving to anchor the pivot pin in said temple supporting member, and a temple having a portion mounted to turn on the pivot pin in the pocket to fold inwardly over the rear face of the frame.

HENRY E. KIRSTEIN.
THOMAS LEYTHAM.